United States Patent [19]

Dübal et al.

[11] Patent Number: 5,071,589
[45] Date of Patent: Dec. 10, 1991

[54] LIQUID-CRYSTALLINE MIXTURES, IN PARTICULAR FERROELECTRIC LIQUID-CRYSTALLINE MIXTURES

[75] Inventors: Hans-Rolf Dübal, Königstein; Claus Escher, Mühltal; Wolfgang Hemmerling, Sulzbach; Ingrid Müller, Hofheim am Taunus; Dieter Ohlendorf, Liederbach; Rainer Wingen, Hattersheim am Main, all of Fed. Rep. of Germany

[73] Assignee: Hoechst Aktiengesellschaft, Frankfurt am Main, Fed. Rep. of Germany

[21] Appl. No.: 245,408

[22] Filed: Sep. 16, 1988

[30] Foreign Application Priority Data

Sep. 19, 1987 [DE] Fed. Rep. of Germany ....... 3731640

[51] Int. Cl.$^5$ ...................... C09K 19/52; C09K 19/34
[52] U.S. Cl. ........................... 252/299.61; 252/299.01; 359/103; 359/104
[58] Field of Search ...................... 252/299.01, 299.61; 350/305 S, 350 R

[56] References Cited

U.S. PATENT DOCUMENTS

| | | | |
|---|---|---|---|
| 4,725,688 | 2/1988 | Taguchi et al. | 252/299.61 |
| 4,784,793 | 11/1988 | Coates et al. | 252/299.61 |
| 4,892,676 | 1/1990 | Sakurai et al. | 252/299.61 |

FOREIGN PATENT DOCUMENTS

| | | | |
|---|---|---|---|
| 206228 | 12/1986 | European Pat. Off. | 252/299.61 |
| 225195 | 6/1987 | European Pat. Off. | 252/299.61 |
| 260077 | 3/1988 | European Pat. Off. | 252/299.61 |
| 2257588 | 6/1973 | Fed. Rep. of Germany | 252/299.61 |
| 3404117 | 8/1985 | Fed. Rep. of Germany | 252/299.61 |
| 3500909 | 7/1986 | Fed. Rep. of Germany | 252/299.61 |
| 3518734 | 11/1986 | Fed. Rep. of Germany | 252/299.61 |
| 61-246284 | 11/1986 | Japan | 252/299.61 |
| 62-209190 | 9/1987 | Japan | 252/299.61 |
| 63-37186 | 2/1988 | Japan | 252/299.61 |
| 86/06401 | 11/1986 | World Int. Prop. O. | 252/299.61 |
| 87/05018 | 8/1987 | World Int. Prop. O. | 252/299.61 |

OTHER PUBLICATIONS

Demus, D. et al., Flussige Kristalle in Tabedlen II, VEB Deutscher Verlag fur Grundstoffindustrie, Leipzig, pp. 376–379 (1984).
L. M. Blinov and L. A. Beresnev, "Ferroelectric Liquid Crystals", Sov. Phys. Usp. 27 (7), Jul. 1984, pp. 492–514.
L. A. Beresnev, E. P. Pozhidayev and L. M. Blinov, "On Mechanisms of Dipolar Ordering in Ferroelectric Liquid Crystals", Ferroelectrics, 1984, vol. 59, pp. 1–10.

*Primary Examiner*—Robert L. Stoll
*Assistant Examiner*—Richard Treanor

[57] ABSTRACT

The novel liquid-crystalline mixtures (in the case of ferroelectric behavior they additionally contain an optically active compound as dope) are constructed from at least 2 mixture components of the general formula (I):

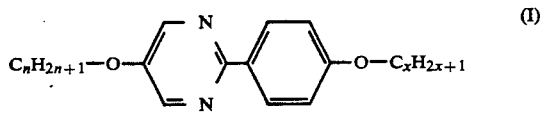

(I)

wherein $n=6$ to 14 and $x=2$ to 14. In addition, the mixtures may also contain cyclohexanecarboxylates of the general formula (II)

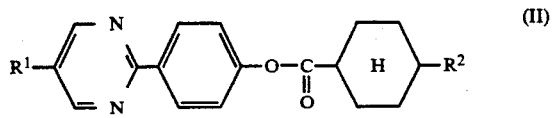

(II)

where $R^1=(C_{10}-C_{16})$ or $(C_8-C_{14})$alkoxy and $R^2=(C_2-C_9)$alkyl, alkenyloxyphenylpyrimidine derivatives of the general formula (III)

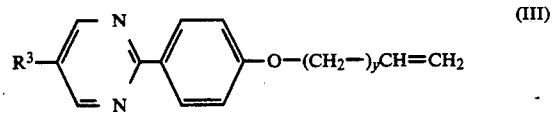

(III)

where $R^3=(C_7-C_{16})$alkyl or $(C_6-C_{14})$alkoxy and $y=4-14$, and/or alkoxyphenyl derivatives of alkylpyrimidine, of the general formula (IV)

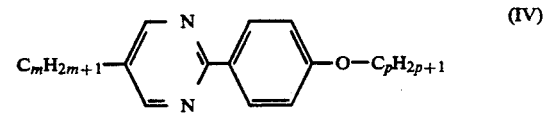

(IV)

where m and $p=6$ to 14.

29 Claims, No Drawings

LIQUID-CRYSTALLINE MIXTURES, IN PARTICULAR FERROELECTRIC LIQUID-CRYSTALLINE MIXTURES

Ferroelectric liquid crystals have recently aroused interest as a display medium in electrooptical components (for example Lagerwall et al. "Ferroelectric Liquid Crystals for Displays", SID Symposium, October Meeting 1985, San Diego, Ca. USA).

For practical use of ferroelectric liquid crystals in electrooptical displays, chiral, tilted smectic phases, such as $S_c$ phases, are required [R. B. Meyer, L. Liebert, L. Strzelecki and P. Keller, J. Physique 36, L-69 (1975)] which are stable over a broad temperature range. This aim can be achieved using compounds which themselves form such phases, for example $S_c$ phases, or alternatively by doping compounds which do not form chiral, tilted smectic phases with optically active compounds [M. Brunet, Cl. Williams, Ann. Phys. 3, 237 (1978)].

In addition, a uniform planar orientation of the liquid crystals is necessary in order to achieve high contrast conditions when ferroelectric liquid-crystal mixtures are used in electrooptical components. It has been shown that a uniform planar orientation in the Sc phase can be achieved when the phase sequence of the liquid-crystal mixture is:

isotropic→nematic→smectic A→smectic C with decreasing temperature (for example K. Flatischler et al., Mol. Cryst. Liq. Cryst. 131, 21 (1985); T. Matsumoto et al., p. 468–470, Proc. of the 6th Int. Display Research Conf., Japan Display, Sept. 30–Oct. 2, 1986, Tokyo, Japan; M. Murakami et al., ibid. p. 344–347). For ferroelectric (chirally smectic) liquid-crystal mixtures, the additional condition must be satisfied that the pitch of the helix in the $S_c^*$ phase must be large, i.e. greater than 5 $\mu$m, and the pitch in the $N^*$ phase must be very large, i.e. greater than 10 $\mu$m, or infinite.

The optical switching time $\tau[\mu s]$ of ferroelectric liquid-crystal systems, which should be as short as possible, depends on the rotational viscosity of the system $\gamma[\text{mPas}]$, the spontaneous polarization $P_s[\text{nC/cm}^2]$ and the electrical field strength $E[\text{V/m}]$, in accordance with the equation $$\tau \approx \frac{\gamma}{P_s \times E}$$

Since the field strength E is determined by the electrode separation in the electrooptical component and by the voltage applied, the ferroelectric display medium must have a low viscosity and a high spontaneous polarization so that a short switching time is achieved.

Finally, besides thermal, chemical and photochemical stability, a small optical anisotropy $\Delta n$, preferably <0.13, and a small positive, or preferably, negative dielectric anisotropy $\Delta \epsilon$ are required. (S. T. Lagerwall et al., "Ferroelectric Liquid Crystals for Displays", SID Symposium, Oct. Meeting 1985, San Diego, Ca., USA).

All these requirements can only be met using mixtures comprising several components. In these mixtures, the basis (or matrix) is preferably compounds which, as far as possible, themselves already have the desired phase sequence $I \rightarrow N \rightarrow S_A \rightarrow S_c$. Further components of the mixture are frequently added to reduce the melting point and to extend the $S_c$ and usually also the N phase, to induce optical activity, for pitch compensation and to match the optical and dielectric anisotropies, but where, for example, the rotational viscosity should not be increased if possible. Some individual components of these and also certain mixtures have already been disclosed in the prior art. However, since development, in particular of ferroelectric liquid-crystal mixtures, can in no way be regarded as complete, the manufacturers of displays are interested in a very wide variety of mixtures. This is also the case because, inter alia, it is only the interaction of the liquid-crystalline mixtures with the individual components of the displays or of the cells (for example the orientation layer) which allows conclusions also to be drawn on the quality of the liquid-crystalline mixtures. The object of the present invention is therefore to find compositions of suitable components for liquid-crystalline mixtures, in particular ferroelectric liquid-crystalline mixtures, which meet as many of the abovementioned criteria as possible.

The invention relates to the liquid-crystalline mixtures characterized below containing structurally similar compounds (at least 2 components of type a, for example a' and a") which are suitable as the matrix (basis) for ferroelectric mixtures.

The invention then further relates to liquid-crystalline mixtures which have favorable values for the optical and dielectric anisotropies, have a nematic phase which is sufficiently broad for practical use and contain a further component of type b.

The invention still further relates to liquid-crystalline mixtures which have a low melting point and a low conversion point of the lower limit of the $S_c$ phase and a broad $S_c$ phase and contain a further component of type c and/or d.

The invention particularly preferably relates to ferroelectric liquid-crystalline mixtures having a short switching time and having the phase sequence $I \rightarrow N^* \rightarrow S_A^*, S_c^*$, the pitch in the nematic phase being >15 $\mu$m and in the $S_c^*$ phase being >5 $\mu$m, and having a negative $\Delta\epsilon$ and $\Delta n$ >0.15.

It is known that certain derivatives of phenylpyrimidine, in particular 5-alkyl-2-(4-alkoxyphenyl)pyrimidines, are capable of forming $S_c$, $S_A$ and N phases (D. Demus and H. Zaschke, "Flüssige Kristalle in Tabellen" [Liquid crystals in tables], VEB Deutscher Verlag für Grundstoffindustrie, Leipzig 1974, pp. 260–261) and, in addition, can be converted into ferroelectric liquid-crystal mixtures through addition of optically active dopes [L. M. Blinov et al., Sow. Phys. Usp. 27 (7), 492 (1984); L. A. Beresnew et al., Ferroelectrics, 59 [321]/1 (1984), lecture at the 5th Conference of Soc. Countries on Liquid Crystals, Odessa, USSR, Oct. 1983; DE-A 3,515,347, EP-A 0,206,228 and EP-A 0,225,195].

It is furthermore known that the melting point can be reduced and the liquid-crystalline phases desired can be extended by mixing several liquid-crystalline compounds [D. Demus et al., Mol. Cryst. Liq. Cryst. 25, 215 (1974), J. W. Goodby, Ferroelectrics 49, 275 (1983)], and that the melting point depression is the more pronounced the greater the mixing components differ structurally (J. S. Dave et al., J. Chem. Soc. 1955, 4305). It could also have been presumed that particularly low mixture melting points, and thus low phase-conversion points for the $S_c$ phase, are obtained when compounds are mixed which, on the one hand, significantly differ structurally, but, on the other hand, are sufficiently similar to be readily miscible.

DE-C 2,257,588 discloses a 5-butoxy-2-(4-pentyloxyphenyl)pyrimidine, but this only forms a nematic phase.

Surprisingly, it has now been found that, as compounds of type a, 5-alkoxy-2-(4-alkoxyphenyl)pyrimidines of the general formula (I)

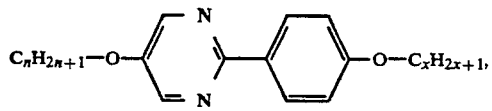
(I)

in which $C_nH_{2n+1}$ and $C_xH_{2x+1}$ are straight-chain alkyl radicals in which n denotes an integer from 6 to 14 and x denotes an integer from 2 to 14, are particularly highly suitable as components of the matrix (basis) for liquid-crystalline mixtures, in particular ferroelectric liquid-crystalline mixtures; of these, at least 2 different compounds a' and a" are present in the mixture. In most cases, they exhibit the desired phase sequence I→N-→$S_A$→$S_C$ with decreasing temperature. Compared with the known 5-alkyl-2-(4-alkoxyphenyl)pyrimidines, they have considerably broader $S_C$ phases and higher conversion temperatures of the $S_C$→$S_A$ transition. In addition, the $S_c$ phase is already formed at a lower number of carbon atoms in the alkyl(oxy) chains, for example already when n=8 and x≥2 or n=6 and x≥6. Surprisingly, the result of this for production of the mixture is a wider choice of homologous, readily miscible compounds having an $S_c$ phase compared with the known 5-alkyl-2-(4-alkoxyphenyl)pyrimidines. As a consequence of their higher phase-transition temperatures $S_A$ and $S_c$ (for example 70° to 90° C.) and their broader $S_c$ phases, this additionally enables mixtures having very broad $S_c$ phases (for example up to about 68° C.) and high $S_A/S_c$ transition temperatures to be produced.

It is particularly surprising and advantageous that mixtures having a low melting point and a particularly broad $S_c$ phase can be obtained using fewer components when compounds of type a in which the alkoxy substituent on the pyrimidine ring remains constant and only the chain length of the alkoxy substituent on the phenyl ring changes in each case at least by the value 2, i.e. n=constant and x=variable where Δx is at least 2, are mixed. In this case, mixtures are preferred which contain at least three compounds a', a" and a''' of type a in which n is the same and x differs in each case by at least the value Δx=2; n here is, in particular in the range between 7 and 14. The advantageous, very large $S_c$ phase range presumably originates from the surprising result that, although the melting point of these mixtures is low, the $S_c/S_A$ transition occurs at very high temperatures and does not decrease, or only does so slightly, through the mixing process according to the invention.

A further advantage here is that it is always possible for the preparation of the compounds to proceed from the same phenol structure

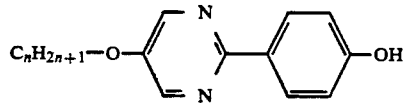

The compounds are prepared by the method given in DE-C 2,257,588. The mixtures according to the invention preferably contain 20 to 90 mol % of the compounds of type a, relative to the mixture of all components.

The mixtures according to the invention comprising compounds of the formula (I) are already very suitable as the matrix for ferroelectric liquid-crystalline mixtures. However, they still have a high optical (Δn) anisotropy and a large positive dielectric (Δε) anisotropy. In addition, the nematic phase is still narrow, depending on the chain length n or x of the substituents.

By adding at least one compound (cyclohexanecarboxylate) of the general formula (II), i.e. a compound of type b,

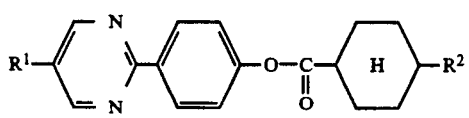
(II)

it is, surprisingly, possible to simultaneously optimize the quantities [Δn] and [Δε] and to match the span of the nematic phase to practical requirements.

In the general formula (II): $R^1$ denotes an alkyl chain having 10 to 16 carbon atoms or an alkoxy chain having 8 to 14 carbon atoms, and $R^2$ denotes an alkyl chain having 2 to 9 carbon atoms. These compounds are described in DE-A 3,731,639. They develop their favorable action even when added in amounts from about 2 mol %, relative to the mixture of the components of type a and b. When amounts from about 10 and up to about 40 mol % are added, the nematic phase is extended by about 8° to 18° C. and the smectic phase by about 6° to 15° C. In addition, it is very advantageous that the rotational viscosity of the basis mixture according to the invention, which is per se already very low, is only increased to a negligible extent due to the addition.

The melting point and the lower phase-transition temperature of the $S_c$ phase of the mixtures can be reduced, if they are still too high, by adding at least one compound (alkenyloxyphenylpyrimidine derivative) of the general formula (III), i.e. a compound of type c, to mixtures of compounds of type a alone or with an additional content of compounds of type b:

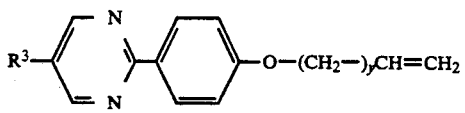
(III)

In the general formula (III), $R^3$ denotes a branched or straight-chain alkyl radical having 7 to 16 carbon atoms or a straight-chain or branched alkoxy radical having 6 to 14 carbon atoms, and y denotes an integer from 4 to 14. These compounds are described in DE-A 3,731,638. Added amounts from about 10 to 35 mol %, relative to the total mixture, cause a reduction in the lower temperature limit of the $S_c$ phase by up to 5° C. The other favorable physical properties of the mixtures are generally not impaired by this addition.

In order to reduce the melting point and the lower temperature limit of the $S_c$ phase, it is also possible to add, together with compounds of type c or in their place, compounds of the formula (IV), i.e. of type d,

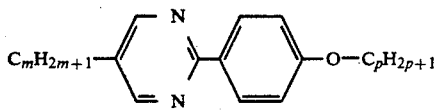

where m and p, independently of one another, are integers from 6 to 14. When amounts from about 10 to 25 mol % of the compound of type d or mixtures with compounds of type c are added, relative to the total mixture, to mixtures of compounds of type a or a and b, the lower temperature limit of the $S_c$ phase is reduced by up to 10° C.

The mixtures comprising compounds of types a, b and c and/or d are particularly highly suitable as the matrix for the production of ferroelectric liquid-crystal mixtures, which are obtained therefrom by doping with optically active compounds.

The following dopes of type e have proven particularly suitable for the purpose of the invention:

a) optically active esters made from o-chlorocarboxylic acids and mesogenic phenols according to DE-A 3,703,228 and, in particular, the optically active esters of the formula below

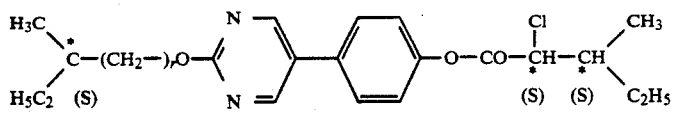

where r=4 to 8 b) optically active esters of N-acylproline according to DE-A 3,644,522 c) optically active esters of 1,3-dioxolane-4-carboxylic acids according to DE-A 3,713,273 d) optically active esters of oxirane-2-carboxylic acids according to DE-A 3,718,174.

These dopes frequently induce the ferroelectric behavior even when added in small amounts from 0.5 mol % and in particular from 3 mol %, relative to the total mixture. The upper limit for the added amount is 30 mol %.

The addition of these dopes generally affects the melting and phase behavior of the mixture, a further reduction in the melting point and the lower temperature limit of the $S_c^*$ phase frequently occurring. In addition, the upper temperature limit of the $S_c^*$ phase may be reduced or increased and the span of the $N^*$ phase may be changed depending on the type and quantity of the dope; these multiplications must be taken into account when producing the matrix mixture. As is known, the optically active dope induces helical twisting in the $S_c$ phase and in the N phase, thus converting these phases into the $S_c^*$ and $N^*$ phases respectively.

The pitch and direction of rotation of these helices in the $N^*$ phase depend on the type and quantity of the optically active dope. It is frequently necessary to compensate for them by adding a further dope which induces a helix of the opposite direction of rotation. In general, a ferroelectric liquid-crystal mixture should have a helix having a pitch of greater than 10 μm in the $N^*$ phase and of at least 5 μm the $S_c^*$ phase. The compounds used to compensate for the pitch should preferably produce no or only negligible spontaneous polarization in the mixture or a spontaneous polarization having the same sign as the optically active dope.

If pitch compensation is necessary, the following combinations are particularly suitable in the mixtures according to the invention:

$a_1$) Optically active α-chlorocarboxylates produce a negative $P_s$ and a helix having a negative direction of rotation. For compensation, derivatives of citronellol of the general formula (V)

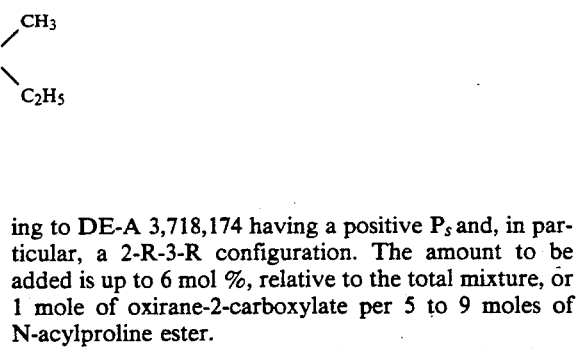

are advantageously added. In this formula, q denotes an integer from 6 to 16, A denotes an oxygen atom or a chemical bond, and B denotes a pyrimidine-2,5-diyl ring, it being possible for the phenylene ring to be bound thereto in the 2- or 5-position. For pitch compensation, up to 4 mol %, relative to the total mixture or 1 mole of citronellol derivative, are required per 7 to 13 moles of α-chlorocarboxylate.

$b_1$) Optically active N-acylproline esters which have an S configuration at the asymmetrical carbon atom and produce a positive $P_s$ and a negative pitch in the mixtures according to the invention can be compensated by adding optically active oxirane-2-carboxylates according to DE-A 3,718,174 having a positive $P_s$ and, in particular, a 2-R-3-R configuration. The amount to be added is up to 6 mol %, relative to the total mixture, or 1 mole of oxirane-2-carboxylate per 5 to 9 moles of N-acylproline ester.

$c_1$) Optically active 1,3-dioxolane-4-carboxylates which have an R configuration and likewise produce a positive $P_s$ and a negative pitch are likewise expediently compensated for using oxirane-2-carboxylates as described under $b_1$).

The use of oxirane-2-carboxylates as described under $b_1$) and $c_1$) has the additional advantage that these compounds themselves produce a very high positive $P_s$ and thus increase the $P_s$ of the total mixture and shorten the switching time.

The values for
the spontaneous polarization $P_s$ [nC/cm²]
the optical switching time τ [μs]
the optical tilt angle θ [degrees]
the rotational viscosity γ [mPas]
the pitch of the helix in the $N^*$ phase [μm]
the pitch of the helix in the $S_c^*$ phase [μm]
the dielectric anisotropy Δε
and the optical anisotropy Δη
were determined for the ready-to-use ferroelectric liquid-crystal mixtures.

The $P_s$ values are measured by the method of H. Diamant et al. (Rev. Sci. Instr., 28, 30, 1957) using measurement cells having an electrode separation of 2 μm and using ground polyimide as the orientation layer.

In order to determine τ and θ, the measurement cell is clamped to the rotating stage of a polarizing microscope between crossed analyzer and polarizer. By rotating the measurement cell from maximum to minimum light transmission at the voltage applied, the optical tilt angle or switching angle 2 θ is determined. The switching time τ is determined with the aid of a photodiode by measuring the time taken by the light signal to increase from a signal height of 10 to 90%. The switching voltage comprises rectangular pulses and is ±10 V/μm.

The rotational viscosity was determined as described in C. Escher et al., "First International Symposium on Ferroelectric Liquid Crystals", Bordeaux Arcachon, Sept. 1987. The values relate to rotation of the C director.

The N* pitch was determined in wedge-shaped cells by the method of Grandjean-Cano [F. Grandjean, CR Acad. Sci, (Paris) 172, 71 (1921); R. Cano, Bull. Soc. Franc. Mineral. F Crystallogr. XC, 333 (1967)] and the $S_c^*$ pitch was determined by evaluating the diffraction image of a laser beam using cells of thickness 400 μm [K. Kondo et al. Jpn. J. Appl. Phys. 21, 224 (1982)]. A polarizing microscope fitted with Berek compensator was used to determine Δn.

Express reference is made to the DE-As 3,731,638, 3,731,639, 3,703,228, 3,644,522, 3,713,273 and 3,718,174 cited in the description.

EXAMPLE 1

A mixture comprising the three components

| | |
|---|---|
| 5-octyloxy-2-(4-octyloxyphenyl)pyrimidine<br>LC(*) ranges: X 50.7 $S_c$ 92.3 $S_A$ 99.5 N 100.3 I | 57.5 mol % |
| 5-octyloxy-2-(4-hexyloxyphenyl)pyrimidine<br>LC ranges: X 47 $S_C$ 90 $S_A$ 97 N 98.8 I | 25 mol % |
| 5-hexyloxy-2-(4-hexyloxyphenyl)pyrimidine<br>LC ranges: X 63.6 $S_c$ 71.7 $S_A$ 72.7 N 97.4 I<br>exhibits the following liquid-crystalline phases with<br>the temperature ranges mentioned (LC ranges):<br>X 33 $S_c$ 85 $S_A$ 96.1 N 98.6 I | 17.5 mol % |

(*) = Liquid Crystalline

EXAMPLE 2

A mixture comprising the 3 components:

| | |
|---|---|
| 5-heptyloxy-2-(4-pentyloxyphenyl)pyrimidine<br>LC ranges: X 53.5 $S_c$ 77.5 $S_A$ 84.2 N 91 I | 30 mol % |
| 5-octyloxy-2-(4-octyloxyphenyl)pyrimidine | 42 mol % |
| 5 hexyloxy-2-(4-hexyloxyphenyl)pyrimidine<br>exhibits the LC ranges:<br>X 34.5 $S_c$ 72 $S_A$ 80.5 N 95.5 I | 28 mol % |

EXAMPLE 3

A mixture comprising the 3 components

| | |
|---|---|
| 5-octyloxy-2-(4-octyloxyphenyl)pyrimidine | 32 mol % |
| 5-octyloxy-2-(4-hexyloxyphenyl)pyrimidine | 48 mol % |
| 5-octyloxy-2-(4-heptyloxyphenyl)pyrimidine<br>LC ranges: X 53.1 $S_c$ 86.2 $S_A$ 96.7 N 97.9 I<br>exhibits the following LC ranges:<br>X 35.5 $S_c$ 88 $S_A$ 97 N 98.5 I | 20 mol % |

EXAMPLE 4

A mixture comprising the three components

| | |
|---|---|
| 5-octyloxy-2-(4-octyloxyphenyl)pyrimidine | 26.8 mol % |
| 5-octyloxy-2-(4-hexyloxyphenyl)pyrimidine | 40.2 mol % |
| 5-octyloxy-2-(4-butyloxyphenyl)pyrimidine<br>LC ranges: X 57.6 $S_c$ 82.2 $S_A$ 97.2 N 99.6 I<br>exhibits the following LC ranges:<br>X 21.5 $S_c$ 85 $S_A$ 95 N 97.5 I | 33 mol % |

This example shows well that a mixture having an already relatively low melting point and a broad $S_c$ phase can be produced from only three homologs of the 5-alkoxy-2(4-alkoxyphenyl)pyrimidine class used according to the invention.

EXAMPLE 5

A mixture comprising the four components

| | |
|---|---|
| 5-octyloxy-2-(4-octyloxyphenyl)pyrimidine | 32 mol % |
| 5-octyloxy-2-(4-hexyloxyphenyl)pyrimidine | 48 mol % |
| 5-hexyloxy-2-(4-octyloxyphenyl)pyrimidine<br>LC ranges: X 60.6 $S_c$ 73.8 $S_A$ 81 N 97.3 I | 12 mol % |
| 5-hexyloxy-2-(4-hexyloxyphenyl)pyrimidine<br>exhibits the following LC ranges:<br>X 32.5 $S_c$ 85 $S_A$ 95.5 N 99 I | 8 mol % |

EXAMPLE 6

A mixture comprising the four components

| | |
|---|---|
| 5-octyloxy-2-(4-octyloxyphenyl)pyrimidine | 21.44 mol % |
| 5-octyloxy-2-(4-hexyloxyphenyl)pyrimidine | 32.16 mol % |
| 5-octyloxy-2-(4-butoxyphenyl)pyrimidine | 26.4 mol % |
| 5-hexyloxy-2-(4-hexyloxyphenyl)pyrimidine<br>exhibits the following LC ranges:<br>X 26 $S_c$ 82 $S_A$ 93.5 N 98 I | 20 mol % |

EXAMPLE 7

A mixture comprising the four components

| | |
|---|---|
| 5-octyloxy-2-(4-octyloxyphenyl)pyrimidine | 24.12 mol % |
| 5-octyloxy-2-(4-hexyloxyphenyl)pyrimidine | 36.18 mol % |
| 5-octyloxy-2-(4-butoxyphenyl)pyrimidine | 29.7 mol % |
| 5-nonyloxy-2-(4-heptyloxyphenyl)pyrimidine<br>LC ranges: X 56 $S_c$ 94.4 $S_A$ 97.5 I<br>exhibits the LC ranges:<br>X 22.5 $S_c$ 85.5 $S_A$ 96 N 98 I | 10 mol % |

EXAMPLE 8

A mixture comprising the five components

| | |
|---|---|
| 5-octyloxy-2-(4-propoxyphenyl)pyrimidine<br>LC ranges: X 51.7 $S_c$ 72 $S_A$ 87.7 N 88 I | 29.75 mol % |
| 5-heptyloxy-2-(4-octyloxyphenyl)pyrimidine<br>LC ranges: X 54.7 $S_c$ 82.7 $S_A$ 89.5 N 96.3 I | 15.0 mol % |
| 5-heptyloxy-2-(4-pentyloxyphenyl)pyrimidine | 16.58 mol % |
| 5-hexyloxy-2-(4-octyloxyphenyl)pyrimidine | 23.20 mol % |
| 5-hexyloxy-2-(4-hexyloxyphenyl)pyrimidine<br>exhibits the LC range:<br>X 15 $S_c$ 66.5 $S_A$ 83.5 N 93 I | 15.47 mol % |

EXAMPLE 9

A mixture comprising the five components:

| | |
|---|---|
| 5-octyloxy-2-(4-octyloxyphenyl)pyrimidine | 18.76 mol % |
| 5-octyloxy-2-(4-hexyloxyphenyl)pyrimidine | 28.14 mol % |
| 5-octyloxy-2-(4-butoxyphenyl)pyrimidine | 23.10 mol % |
| 5-hexyloxy-2-(4-octyloxyphenyl)pyrimidine | 15.0 mol % |
| 5-hexyloxy-2-(4-hexyloxyphenyl)pyrimidine | 15.0 mol % |
| exhibits the following LC ranges: | |
| X 27.7 $S_c$ 80 $S_A$ 92.3 N 97.6 I | |

EXAMPLE 10

A mixture comprising the four components

| | |
|---|---|
| 5-octyloxy-2-(4-decyloxyphenyl)pyrimidine | 25.0 mol % |
| LC ranges: X 50.2 $S_c$ 88.9 $S_A$ 99.6 I | |
| 5-octyloxy-2-(4-octyloxyphenyl)pyrimidine | 13.75 mol % |
| 5-octyloxy-2-(4-hexyloxyphenyl)pyrimidine | 29.8 mol % |
| 5-octyloxy-2-(4-butoxyphenyl)pyrimidine | 31.45 mol % |
| exhibits the following LC ranges: | |
| X 13.1 $S_c$ 81.6 $S_A$ 95.4 N 98.2 I | |

By mixing only four components, an $S_c$ range from 13.1° C. to 81.6° C., i.e. with a phase width of 68.5° C., is produced. In addition, this mixture also exhibits the phase sequence I→N→$S_A$→$S_c$ desired and has a clear point of less than 100° C., which is advantageous for application (for example filling the displays).

EXAMPLE 11

A mixture comprising the four components

| | |
|---|---|
| mixture from Example 4 | 85 mol % |
| [4-(5-decylpyrimidin-2-yl)]phenyl trans-4-pentylcyclohexanecarboxylate | 15 mol % |
| exhibits the following LC ranges: | |
| X 15 $S_c$ 84.5 $S_A$ 91.5 N 105 I | |

Compared with Example 4, the width of the $S_c$ phase and that of the N phase is greatly increased by adding the cyclohexanecarboxylate.

EXAMPLE 12

A mixture comprising the five components

| | |
|---|---|
| mixture from Example 10 | 75 mol % |
| [4-(5-undecylpyrimidin-2-yl)]phenyl trans-4-pentylcyclohexanecarboxylate | 25 mol % |
| exhibits the following LC ranges: | |
| X 3.4 $S_c$ 85.6 $S_A$ 91 N 110.2 I | |

EXAMPLE 13

A mixture comprising the five components

| | |
|---|---|
| mixture from Example 10 | 80 mol % |
| [4-(5-dodecylpyrimidin-2-yl)]phenyl trans-4-pentylcyclohexanecarboxylate | 20 mol % |
| exhibits the following LC ranges: | |
| X 8.3 $S_c$ 81.5 $S_A$ 93 N 107 I | |

EXAMPLE 14

A mixture comprising the six components

| | |
|---|---|
| 5-octyloxy-2-(4-decyloxyphenyl)pyrimidine | 12.8 mol % |
| 5-octyloxy-2-(4-octyloxyphenyl)pyrimidine | 18.0 mol % |
| 5-octyloxy-2-(4-hexyloxyphenyl)pyrimidine | 27.02 mol % |
| 5-octyloxy-2-(4-butoxyphenyl)pyrimidine | 22.18 mol % |
| [4-(5-decylpyrimidin-2-yl)]phenyl trans-4-pentylcyclohexanecarboxylate | 12 mol % |
| [4-(5-octyloxypyrimidin-2-yl)]phenyl trans-4-pentylcyclohexanecarboxylate | 8 mol % |
| exhibits the following LC ranges: | |
| X 10.7 $S_c$ 86 $S_A$ 90.1 N 108.5 I. | |

EXAMPLE 15a

A mixture comprising the six components

| | |
|---|---|
| mixture from Example 10 | 81 mol % |
| 5-octyloxy-2-(4-ethoxyphenyl)pyrimidine | 10 mol % |
| LC ranges: X 64.5 $S_c$ 66 $S_A$ 98.5 N 97.4 I | |
| [4-(5-octyloxypyrimidin-2-yl)]phenyl trans-4-pentylcyclohexanecarboxylate | 9 mol % |
| exhibits the following LC ranges: | |
| X 12.2 $S_c$ 79.5 $S_A$ 91 N 102.6 I | |

EXAMPLE 15b

Addition of 30 mol % of 5-octyl-2-(4-decyloxyphenyl)pyrimidine to 70 mol % of the mixture from Example 15a reduces both the melting point and the $S_A$/$S_c$ transition temperature by 6° C., i.e. shifts the broad $S_c$ phase range towards lower temperatures without essentially limiting it.

EXAMPLE 16

A mixture comprising the following seven components

| | |
|---|---|
| 5-octyloxy-2-(4-decyloxyphenyl)pyrimidine | 12.7 mol % |
| 5-octyloxy-2-(4-octyloxyphenyl)pyrimidine | 6.98 mol % |
| 5-octyloxy-2-(4-hexyloxyphenyl)pyrimidine | 15.14 mol % |
| 5-octyloxy-2-(4-butoxyphenyl)pyrimidine | 15.98 mol % |
| 5-octyloxy-2-(4-ethoxyphenyl)pyrimidine | 11.69 mol % |
| [4-(5-octyloxypyrimidin-2-yl)]phenyl trans-4-pentylcyclohexanecarboxylate | 10.69 mol % |
| 2-[4-(10-undecen-1-yl)oxyphenyl]-5-octyl-pyrimidine | 26.88 mol % |
| exhibits the following LC ranges: | |
| X 2.5 $S_c$ 69.4 $S_A$ 81.6 N 95 I | |

EXAMPLE 17

A mixture comprising the following six components

| | |
|---|---|
| 5-octyloxy-2-(4-dodecyloxyphenyl)pyrimidine | 12.49 mol % |
| LC ranges: X 54 $S_c$ 86.5 $S_A$ 97.6 I | |
| 5-octyloxy-2-(4-decyloxyphenyl)pyrimidine | 12.48 mol % |
| 5-octyloxy-2-(4-octyloxyphenyl)pyrimidine | 6.88 mol % |
| 5-octyloxy-2-(4-hexyloxyphenyl)pyrimidine | 20.51 mol % |
| 5-octyloxy-2-(4-butoxyphenyl)pyrimidine | 22.64 mol % |
| [4-(5-decylpyrimidin-2-yl)]phenyl trans-4-pentylcyclohexanecarboxylate | 25.0 mol % |
| exhibits the following LC ranges: | |
| X 7.0 $S_c$ 85.6 $S_A$ 89.7 N 110.1 I | |

EXAMPLE 18

A mixture comprising the following seven components

| | |
|---|---|
| mixture from Example 17 | 85 mol % |
| 5-octyloxy-2-(4-dodecyloxyphenyl)pyrimidine | 15 mol % |
| exhibits the following LC ranges: | |

-continued

X −2.5 S$_c$ 80.6 S$_A$ 87.2 N 102.5 I

EXAMPLE 19

A ferroelectric liquid-crystal mixture comprising the following components

| | |
|---|---|
| 5-octyloxy-2-(4-dodecyloxyphenyl)pyrimidine | 10.9 mol % |
| 5-octyloxy-2-(4-decyloxyphenyl)pyrimidine | 10.9 mol % |
| 5-octyloxy-2-(4-octyloxyphenyl)pyrimidine | 6.0 mol % |
| 5-octyloxy-2-(4-hexyloxyphenyl)pyrimidine | 13.0 mol % |
| 5-octyloxy-2-(4-butoxyphenyl)pyrimidine | 16.57 mol % |
| 5-octyloxy-2-(4-ethoxyphenyl)pyrimidine | 10.13 mol % |
| [4-(5-decylpyrimidin-2-yl)]phenyl trans-4-pentylcyclohexanecarboxylate | 22.50 mol % |
| 4-[2-((S)-7-methylnonyloxy)pyrimidin-5-yl]- phenyl (2S,3S)-2-chloro-3-methylpentanoate | 10.0 mol % |
| exhibits the LC ranges: X −5.5 S$_c$* 78 S$_A$* 82.5 N* 99.5 I | |

At 25° C., the spontaneous polarization $P_s = -19$ nC/cm$^2$, $\tau=30$ μs, $\theta=30.5°$, $\Delta\tau(20$ kHz$)=-0.8$ and $\gamma=100$ mPas.

EXAMPLE 20

A ferroelectric liquid-crystal mixture comprising the following components

| | |
|---|---|
| 5-octyloxy-2-(4-decyloxyphenyl)pyrimidine | 11.95 mol % |
| 5-octyloxy-2-(4-octyloxyphenyl)pyrimidine | 6.58 mol % |
| 5-octyloxy-2-(4-hexyloxyphenyl)pyrimidine | 14.25 mol % |
| 5-octyloxy-2-(4-butoxyphenyl)pyrimidine | 15.03 mol % |
| 5-octyloxy-2-(4-ethoxyphenyl)pyrimidine | 5.92 mol % |
| [4-(5-octyloxypyrimidin-2-yl)]phenyl trans-4-pentylcyclohexanecarboxylate | 10.07 mol % |
| 4-[2-((S)-7-methylnonyloxy)pyrimidin-5-yl]- phenyl (2S,3S)-2-chloro-3-methylpentanoate | 9.9 mol % |
| 5-[4-((S)-3,7-dimethyloct-6-en-1-yl)oxy- phenyl]-2-octyloxypyrimidine | 1 mol % |
| 2-[4-(10-undecen-1-yl)oxyphenyl]-5-octyl- pyrimidine | 25.3 mol % |
| exhibits the LC ranges: X −1 S$_c$* 71 S$_A$* 79 N* 90 I | |

At 25° C., the values for the spontaneous polarization $P_s = -20$ nC/cm$^2$, $\tau=30$ μs, $\theta=29.5°$, $\gamma=54$ mPas, $\Delta n=0.12$, $\Delta\epsilon$ (20 kHz)$=-0.8$ and pitch N* for 79° C.$=-36$ μm and for 82° C.$=+74.3$ μm, i.e. a helix inversion occurs in the N* phase, which indicates optimum pitch compensation.

EXAMPLE 21

A ferroelectric liquid-crystal mixture comprising the following components:

| | |
|---|---|
| LC matrix mixture from Example 18 | 78.8 mol % |
| 4-[2-((S)-7-methylnonyloxy)pyrimidin-5-yl]- phenyl (2S,3S)-2-chloro-3-methylpentanoate | 19.7 mol % |
| 5-[4-((S)-3,7-dimethyloct-6-en-1-yl)oxy- phenyl]-2-octyloxypyrimidine | 1.5 mol % |
| exhibits the following LC ranges: X −7.2 X$_c$* 71.6 S$_A$* 76.4 N* 86.1 I | |
| At 250° C., the values for $P_s = -41$ nC/cm$^2$, $\tau = 18$ μs, $\Theta = 32°$, $\gamma = 160$ mPas, $\Delta n = 0.12$, $\Delta\epsilon$ (20 kHz) $= -0.9$, pitch S$_c$* = 9 μm and pitch N* (78.5° C.) = −31.8 μm. | |

EXAMPLE 22

A ferroelectric liquid-crystal mixture comprising the following components

| | |
|---|---|
| LC matrix mixture from Example 18 | 95 mol % |
| 4-[2-((S)-7-methylnonyloxy)pyrimidin-5-yl]- phenyl (2S,3S)-2-chloro-3-methylpentanoate | 5 mol % |
| exhibits the following LC ranges: X −6.5 S$_c$* 77.4 S$_A$* 82.5 N* 91.5 I | |
| At 250° C., the values for $P_s = -8$ nC/cm$^2$, $\tau = 100$ μs, $\Theta = 32°$, $\gamma = 56$ mPas, $\Delta n = 0.12$, $\Delta\epsilon$ (20 kHz) $= -0.8$, pitch S$_c$* greater than 15 μm and pitch N* (86° C.) = −26 μm. | |

As the results show, pitch compensation is not necessary when the optically active dopes used here are used in a concentration of 5 mol %.

EXAMPLE 23

A ferroelectric liquid-crystal mixture comprising the following components

| | |
|---|---|
| LC matrix mixture from Example 18 | 95 mol % |
| (R)-[4-(5-n-octylpyrimidin-2-yl)phenyl] 2,2-dimethyl-1,3-dioxolane-4-carboxylate | 5 mol % |
| exhibits the following LC ranges: X −4.5 S$_c$ 78 S$_A$ 83.7 N* 98.5 I | |

At 25° C., the following values arise for $P_s = +8$ nC/cm$^2$, $\tau=70$ μs, $\theta=29°$, $\Delta n=0.12$, $\Delta\epsilon$ (20 kHz) less than zero and pitch N* (84°)$=-14$ μm. Pitch compensation can again be omitted in this mixture.

EXAMPLE 24

A mixture comprising the five components

| | |
|---|---|
| mixture from Example 10 | 70 mol % |
| [4-(5-dodecylpyrimidin-2-yl)]phenyl trans-4-pentylcyclohexanecarboxylate | 30 mol % |
| exhibits the phase sequence: X 9 S$_c$ 86 S$_A$ 92 N 112 I. | |

EXAMPLE 25

A mixture comprising the five components

| | |
|---|---|
| mixture from Example 10 | 85 mol % |
| 5-octyl-2-(4-decyloxyphenyl)pyrimidine | 15 mol % |
| exhibits the phase sequence X 9 S$_c$ 76 S$_A$ 89 N 93 I. | |

EXAMPLE 26

A mixture comprising the six components

| | |
|---|---|
| mixture from Example 10 | 80 mol % |
| [4-(5-undecylpyrimidin-2-yl)]phenyl trans-4-pentylcyclohexanecarboxylate | 13 mol % |
| [4-(5-octyloxypyrimidin-2-yl)]phenyl trans-4-pentylcyclohexanecarboxylate | 7 mol % |
| exhibits the phase sequence X 8 S$_c$ 85 S$_A$ 91 N 109 I and thus an S$_c$ range of 77° C. | |

EXAMPLE 27

A mixture comprising the six components

| mixture from Example 10 | 49 mol % |
|---|---|
| 5-octyl-2-(4-decyloxyphenyl)pyrimidine | 30 mol % |
| [4-(5-decylpyrimidin-2-yl)]phenyl trans-4-pentylcyclohexanecarboxylate | 21 mol % | has the phase sequence:
X 8 $S_c$ 80 $S_A$ 83 N 102 I and can be supercooled to $-10°$ C.

EXAMPLE 28

A mixture comprising the seven components

| 5-octyloxy-2-(4-hexyloxyphenyl)pyrimidine | 17 mol % |
|---|---|
| 5-octyloxy-2-(4-octyloxyphenyl)pyrimidine | 6 mol % |
| 5-octyloxy-2-(4-butoxyphenyl)pyrimidine | 19 mol % |
| 5-octyloxy-2-(4-decyloxyphenyl)pyrimidine | 11 mol % |
| 5-octyloxy-2-(4-dodecyloxyphenyl)pyrimidine | 11 mol % |
| [4-(5-decylpyrimidin-2-yl)]phenyl trans-4-pentylcyclohexanecarboxylate | 21 mol % |
| 5-octyl-2-(4-dodecyloxyphenyl)pyrimidine | 15 mol % | has the phase sequence
X $-1$ $S_c$ 81 $S_A$ 87 N 102 I

EXAMPLE 29

A mixture comprising the nine components:

| mixture from Example 15a | 72.5 mol % |
|---|---|
| 5-octyl-2-(4-dodecyloxyphenyl)pyrimidine | 27.5 mol % | has the phase sequence
X ∅ $S_c$ 70 $S_A$ 85 N 93 I.

EXAMPLE 30

A mixture comprising the seven components:

| mixture from Example 10 | 48 mol % |
|---|---|
| 5-octyloxy-2-(4-dodecyloxyphenyl)pyrimidine | 11 mol % |
| 5-octyloxy-2-(4-ethoxyphenyl)pyrimidine | 11 mol % |
| [4-(5-decylpyrimidin-2-yl)]phenyl trans-4-pentylcyclohexanecarboxylate | 30 mol % | has the phase sequence
X $-3$ $S_c$ 81 $S_A$ 82 N 112 I.

EXAMPLE 31

A binary mixture comprising

| 5-octyloxy-2-(4-butoxyphenyl)pyrimidine X 58 $S_c$ 87 $S_A$ 97 N 99 I and | 50 mol-% |
|---|---|
| 5-octyloxy-2-(4-decyloxyphenyl)pyrimidine X 52 $S_c$ 89 $S_A$ 99 I | 50 mol-% | has the phase sequence
X 19 $S_c$ 75 $S_A$ 93 N 94 I
and thus already has a 56° C. broad $S_c$ range.

EXAMPLE 32

A binary mixture comprising

| 5-decyloxy-2-(4-decyloxyphenyl)pyrimidine X 53 $S_c$ 103 I and | 40 mol-% |
|---|---|
| 5-decyloxy-2-(4-octyloxyphenyl)pyrimidine X 58 $S_c$ 101 $S_A$ 102 I | 60 mol-% | has the phase sequence
X 43 $S_c$ 101 $S_A$ 102 I.
This example shows that the melting point is reduced, but not the $S_c/S_A$ transition.

EXAMPLE 33

A mixture comprising the three components

| mixture from Example 32 | 50 mol-% |
|---|---|
| 5-decyloxy-2-(4-hexyloxyphenyl)pyrimidine X 52 $S_c$ 100 $S_A$ 102 I | 50 mol-% | has the phase sequence
X 32 $S_c$ 100 $S_A$ 102 I.

This example again shows the considerable reduction in the melting point without a reduction in the $S_c/S_A$ transition temperature. With only three components, an $S_c$ range of 68° C., similar to in Example 10, in which the mixing takes place by the same principle, is thereby obtained.

EXAMPLE 34

A mixture comprising the eight components:

| mixture from Example 10 | 45 mol-% |
|---|---|
| 5-octyl-2-(4-decyloxyphenyl)pyrimidine | 14 mol-% |
| 5-octyl-2-(4-hexyloxyphenyl)pyrimidine | 22 mol-% |
| 5-octyl-2-(4-octyloxyphenyl)pyrimidine | 19 mol-% | has the phase sequence
X 5 $S_c$ 63 $S_A$ 77 N 82 I.

EXAMPLE 35

Starting from the mixture of this example, it is shown that it is possible to obtain, on this basis, a broad $S_c$ phase without an $S_A$ phase. The phase sequence X→$S_c$→N→I is favored for some specific applications of ferroelectric liquid crystals [see, for example, C. Bowry et al., Eurodisplay 87, Meeting Volume, page 33 (1987)].

A mixture comprising the eight components:

| mixture from Example 34 | 65 mol-% |
|---|---|
| [4-(5-decylpyrimidin-2-yl)]phenyl trans-4-pentylcyclohexanecarboxylate | 35 mol-% | has the phase sequence:
X $-2$ $S_c$ 71 N 108 I.

EXAMPLE 36

A mixture comprising the five components:

| mixture from Example 10 | 70 mol-% |
|---|---|
| [4-(5-decylpyrimidin-2-yl)]phenyl trans-4-pentylcyclohexanecarboxylate | 30 mol-% | has the phase sequence
X 7 $S_c$ 86 N 113 I.

EXAMPLE 37

A ferroelectric liquid-crystal mixture comprising the six components:

| mixture from Example 36 | 90 mol-% |
|---|---|
| 4-[2-((S)-7-methylnonyloxy)pyrimidin-5-yl]-phenyl (2S,3S)-2-chloro-3-methylpentanoate | 10 mol-% | has the phase sequence

X −4 $S_c^*$ 83 N* 104 I.
The spontaneous polarization is 18 nC/cm$^2$ (20° C.).

EXAMPLE 38

A ferroelectric mixture comprising the nine components:

| | |
|---|---|
| 5-octyloxy-2-(4-hexyloxyphenyl)pyrimidine | 16 mol-% |
| 5-octyloxy-2-(4-octyloxyphenyl)pyrimidine | 5 mol-% |
| 5-octyloxy-2-(4-butoxyphenyl)pyrimidine | 18 mol-% |
| 5-octyloxy-2-(4-decyloxyphenyl)pyrimidine | 10 mol-% |
| 5-octyloxy-2-(4-dodecyloxyphenyl)pyrimidine | 10 mol-% |
| [4-(5-decylpyrimidin-2-yl)]phenyl trans-4-pentylcyclohexanecarboxylate | 23 mol-% |
| 5-octyl-2-(4-dodecyloxyphenyl)pyrimidine | 14 mol-% |
| 4-(2-octyloxypyrimidin-5-yl)phenyl (2R,3R)-3-propyloxirane-2-carboxylate | 1.24 mol-% |
| (R)-4-(5-n-octylpyrimidin-2-yl)phenyl 2,2-dimethyl-1,3-dioxolane-4-carboxylate | 2.76 mol-% | has an $S_c^*$ range from −5 to 79° C. and a spontaneous polarization at 25° C. of 8.7 nC/cm$^2$. The cholesteric phase above the $S_A$ phase is pitch-compensated.

EXAMPLE 39

A ferroelectric mixture comprising the nine components:

| | |
|---|---|
| 5-octyloxy-2-(4-hexyloxyphenyl)pyrimidine | 14 mol-% |
| 5-octyloxy-2-(4-octyloxyphenyl)pyrimidine | 5 mol-% |
| 5-octyloxy-2-(4-butoxyphenyl)pyrimidine | 16 mol-% |
| 5-octyloxy-2-(4-decyloxyphenyl)pyrimidine | 9 mol-% |
| 5-octyloxy-2-(4-dodecyloxyphenyl)pyrimidine | 9 mol-% |
| [4-(5-decylpyrimidin-2-yl)]phenyl trans-4-pentylcyclohexanecarboxylate | 21 mol-% |
| 5-octyl-2-(4-dodecyloxyphenyl)pyrimidine | 13 mol-% |
| 4-(2-octyloxypyrimidin-5-yl)phenyl (2R,3R)-3-propyloxirane-2-carboxylate | 4 mol-% |
| (R)-4-(5-n-octylpyrimidin-2-yl)phenyl 2,2-dimethyl-1,3-dioxolane-4-carboxylate | 9 mol-% | has an $S_c^*$ range from 3 to 75° C. and a spontaneous polarization of 38 nC/cm$^2$, and an electrooptical switching time of 20 μs at 10 V/μm rectangular voltage and 25° C.

EXAMPLE 40

A mixture comprising the five components:

| | |
|---|---|
| mixture from Example 10 | 85 mol-% |
| [4-(5-decylpyrimidin-2-yl)]phenyl trans-4-pentylcyclohexanecarboxylate | 15 mol-% | has the phase sequence:
X 9 $S_c$ 84 $S_A$ 93 N 105 I.

EXAMPLE 41

A ferroelectric mixture comprising the seven components

| | |
|---|---|
| mixture from Example 40 | 90 mol-% |
| (R)-4-(5-n-octyloxypyrimidin-2-yl)phenyl 2,2-dimethyl-1,3-dioxolane-4-carboxylate | 7.4 mol-% |
| 4-(2-[(S)-7-methyl]nonyloxypyrimidin-5-yl)-phenyl (2R,3R)-3-propyloxirane-2-carboxylate | 2.6 mol-% | has an $S_c^*$ phase from −1° C. to 79° C. At 25° C., the spontaneous polarization is 28 nC/cm$^2$ and the switching time is 16 μs at 10 V/μm.

EXAMPLE 42

A ferroelectric mixture comprising the seven components

| | |
|---|---|
| mixture from Example 40 | 90 mol-% |
| (R)-4-(5-n-octyloxypyrimidin-2-yl)phenyl 2,2-dimethyl-1,3-dioxolane-4-carboxylate | 8.1 mol-% |
| 4-(2-octyloxypyrimidin-5-yl)phenyl (2R,3R)-3-propyloxirane-2-carboxylate | 1.9 mol-% |
| | 1.9 mol-% | has an $S_c^*$ phase from −1° C. to 78° C. At 25° C., the spontaneous polarization is 24 nC/cm$^2$ and the switching time is 29 μs at 10 V/μm.

EXAMPLE 43

A ferroelectric mixture comprising the seven components

| | |
|---|---|
| mixture from Example 40 | 90 mol-% |
| (R)-4-(5-n-octyloxypyrimidin-2-yl)phenyl 2,2-pentamethylene-1,3-dioxolane-4-carboxylate | 7.4 mol-% |
| 4-(2-[(S)-7-methyl]nonyloxypyrimidin-5-yl)-phenyl (2R,3R)-3-propyloxirane-2-carboxylate | 2.6 mol-% | has an $S_c^*$ phase from −1° C. to 79° C. At 25° C., the spontaneous polarization is 29 nC/cm$^2$ and the switching time is 38 μs at 10 V/μm.

EXAMPLE 44

A ferroelectric mixture comprising the seven components

| | |
|---|---|
| mixture from Example 40 | 98 mol-% |
| (R)-4-(5-n-octyloxypyrimidin-2-yl)phenyl 2,2-dimethyl-1,3-dioxolane-4-carboxylate | 1.6 mol-% |
| [4-(2-octyloxypyrimidin-5-yl)phenyl] (2R,3R)-3-propyloxirane-2-carboxylate | 0.4 mol-% | has an $S_c^*$ phase from 7° C. to 82° C. At 25° C., the spontaneous polarization is 3 nC/cm$^2$.

The mixtures in Examples 41 to 44 are pitch-compensated in the cholesteric phase, i.e. the two optically active dopes have an inverted direction of rotation of the helix, so that the cholesteric helix pitch becomes infinite at a certain temperature. In the remaining cholesteric temperature range, the helix pitch is >10 μm, which means that a good planar orientation is obtained.

I claim:

1. A liquid-crystalline mixture, containing at least one 5-alkoxy-2-(4-alkoxyphenyl)pyrimidine of the formula (Ia), at least one 5-alkoxy-2-(4-alkoxyphenyl)pyrimidine of the formula (Ib) and at least one 5-alkoxy-2-(4-alkoxyphenyl) pyrimidine of the formula (Ic) as mixture components

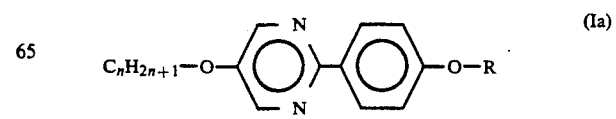
(Ia)

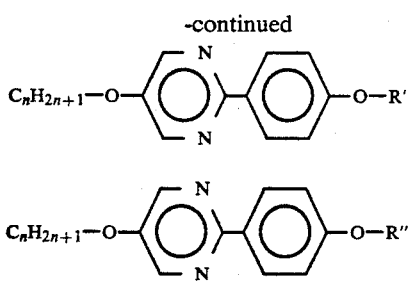

in which the alkyl radicals are straight-chain alkyl radicals in which n is an integer from 7 to 14 and R, R' and R" are straight-chain alkyl radicals having from 2 to 14 carbon atoms, which the proviso that the alkyl radicals R, R' and R" of the three compounds (Ia), (Ib) and (Ic) each differ in their chain-length from the other two by at least two carbon atoms and n for all three compounds is the same integer.

2. A liquid-crystalline mixture which contains at least 3 mixture components as claimed in claim 1 in which n denotes an integer from 7 to 14.

3. A liquid-crystalline mixture which contains 20 to 90 mol %, relative to the mixture of all the mixture components, of mixture components as claimed in claim 1.

4. A liquid-crystalline mixture as claimed in claim 1, further containing at least one cyclohexanecarboxylate of the formula (II)

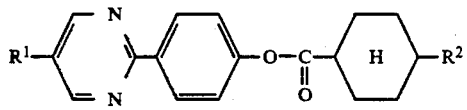

in which $R^1$ is an alkyl radical having 10 to 16 carbon atoms or an alkoxy radical having 8 to 14 carbon atoms, and $R^2$ is an alkyl radical having 2 to 9 carbon atoms.

5. A liquid-crystalline mixture as claimed in claim 4, which contains 2 to 40 mol %, relative to the mixture of all the mixture components, of the mixture component of the formula (II).

6. A liquid-crystalline mixture as claimed in claim 1, further containing at least one alkenyloxyphenylpyrimidine derivative of the formula (III)

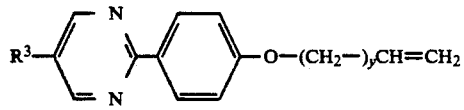

in which $R^3$ denotes an alkyl chain having 7 to 16 carbon atoms or an alkoxy chain having 6 to 14 carbon atoms, and y is an integer from 4 to 14.

7. A liquid-crystalline mixture as claimed in claim 4, further containing at least one alkenyloxyphenylpyrimidine derivative of the formula (III)

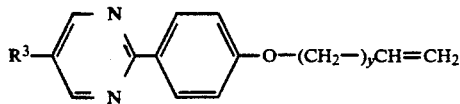

in which $R^3$ is an alkyl chain having 7 to 16 carbon atoms or an alkoxy chain having 6 to 14 carbon atoms, and y is an integer from 4 to 14.

8. A liquid-crystalline mixture as claimed in claim 6, which contains 10 to 35 mol %, relative to the mixture of all the mixture components, of the mixture component of the formula (III).

9. A liquid-crystalline mixture as claimed in claim 1, further containing at least one alkoxyphenyl derivative of an alkylpyrimidine of the formula (IV)

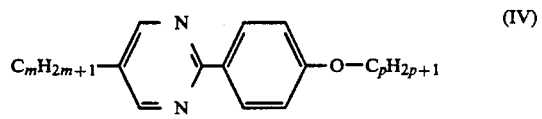

in which m and p, independently of one another, are integers from 6 to 14.

10. A liquid-crystalline mixture as claimed in claim 4, further containing at least one alkoxyphenyl derivative of an alkylpyrimidine of the formula (IV)

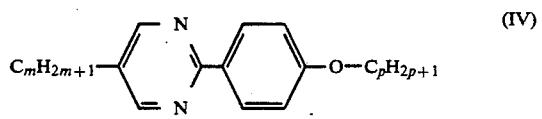

in which m and p, independently of one another, are integers from 6 to 14.

11. A liquid-crystalline mixture as claimed in claim 6, further containing at least one alkoxyphenyl derivative of an alkylpyrimidine of the formula (IV)

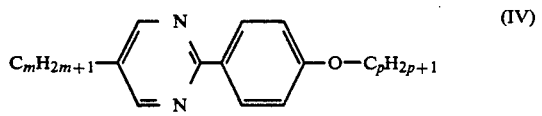

in which m and p, independently of one another are integers from 6 to 14.

12. A liquid-crystalline mixture as claimed in claim 9, which contains 10 to 25 mol % of the mixture component(s) of the formula (IV) or of the formulae (III) and (IV), relative to the mixture of all the mixture components.

13. A ferroelectric liquid-crystal mixture comprising a, liquid-crystalline mixture as claimed in claim 1 as the matrix and at least one optically active dope.

14. A ferroelectric liquid-crystal mixture comprising a liquid-crystalline mixture as claimed in claim 4 as the matrix and at least one optically active dope.

15. A ferroelectric liquid-crystal mixture comprising a liquid-crystalline mixture as claimed in claim 6 as the matrix and at least one optically active dope.

16. A ferroelectric liquid-crystal mixture comprising a liquid-crystalline mixture as claimed in claim 9 as the matrix and at least one optically active dope.

17. A ferroelectric liquid-crystal mixture as claimed in claim 13, containing at least one optically active compound selected from the group consisting
  a) optically active esters made from α-chlorocarboxylic acids and mesogenic phenols
  b) optically active esters of N-acylproline
  c) optically active esters of 1,3-dioxolane-4-carboxylic acids d) optically active esters of oxirane-2-carboxylic acids as the dope.

18. A ferroelectric liquid-crystal mixture as claimed in claim 17, which contains 0.5 to 30 mol % of the dope, relative to the mixture of all the mixture components.

19. A ferroelectric liquid-crystal mixture as claimed in claim 17, containing an optically active ester of the formula

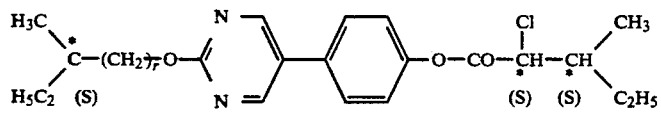

where r=4 to 8.

20. A ferroelectric liquid-crystal mixture as claimed in claim 13, containing an additional optically active dope which compensates for the pitch of the induced helix.

21. A ferroelectric liquid-crystal mixture as claimed in claim 14, containing an additional optically active dope which compensates for the pitch of the induced helix.

22. A ferroelectric liquid-crystal mixture as claimed in claim 15, containing an additional optically active dope which compensates for the pitch of the induced helix.

23. A ferroelectric liquid-crystal mixture as claimed in claim 16, containing an additional optically active dope which compensates for the pitch of the induced helix.

24. A ferroelectric liquid-crystal mixture as claimed in claim 20, which contains an optically active ester made from an α-chlorocarboxylic acid and a mesogenic phenol, and a derivative of citronellol of the formula (V)

(V)

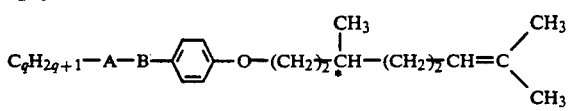

in which q is an integer from 6 to 16, A is an oxygen atom or a chemical bond, and B is a pyrimidine-2,5-diyl ring, it being possible for the phenylene ring bound to the pyrimidinediyl ring to be in the 2- or 5.position.

25. An electrooptical component, containing a liquid-crystalline mixture as claimed in claim 1.

26. An electrooptical component, containing a liquid-crystalline mixture as claimed in claim 4.

27. An electrooptical component, containing a liquid-crystalline mixture as claimed in claim 6.

28. An electrooptical component, containing a liquid-crystalline mixture as claimed in claim 9.

29. An electrooptical component, containing a liquid-crystalline mixture as claimed in claim 13.

* * * * *